United States Patent
Prakash et al.

(10) Patent No.: US 9,712,508 B2
(45) Date of Patent: Jul. 18, 2017

(54) ONE-TOUCH DEVICE PERSONALIZATION

(71) Applicant: Intel Corporation, Santa Clara, CA (US)

(72) Inventors: Gyan Prakash, Beaverton, OR (US); James F. Bodio, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/799,301

(22) Filed: Mar. 13, 2013

(65) Prior Publication Data

US 2014/0281490 A1    Sep. 18, 2014

(51) Int. Cl.
*H04L 29/06* (2006.01)
*G06F 21/31* (2013.01)
(Continued)

(52) U.S. Cl.
CPC ........ *H04L 63/062* (2013.01); *G06F 11/1448* (2013.01); *G06F 11/1451* (2013.01);
(Continued)

(58) Field of Classification Search
CPC ..... H04L 9/3294; H04L 63/08; H04L 63/428; H04L 63/823; H04L 63/062; H04L 63/0853; G06F 21/31
(Continued)

(56) References Cited

U.S. PATENT DOCUMENTS 6,029,166 A * 2/2000 Mutalik et al.
6,807,277 B1 * 10/2004 Doonan .............. H04L 63/0823
380/264

(Continued)

FOREIGN PATENT DOCUMENTS

EP     2031538 A2    3/2009
JP     2002-314706 A    10/2002
(Continued)

OTHER PUBLICATIONS

"iCloud," Wikipedia, The Free Encyclopedia, retrieved from: <http://en.wikipedia.org/w/index.php?title=ICloud&oldid=498001559>, edited Jun. 17, 2012, 6 pages.
(Continued)

*Primary Examiner* — Hadi Armouche
*Assistant Examiner* — Shahriar Zarrineh
(74) *Attorney, Agent, or Firm* — Barnes & Thornburg LLP

(57) ABSTRACT

Technologies for one-touch device personalization include at least two mobile computing devices configured to communicate with a personalization server. The first mobile computing device tracks changes to device personalization data and backs up the personalization data to the personalization server. The personalization server associates the personalization data to authenticated user credentials. The personalization server may store the personalization data in an operating-system-independent format. Later, a second mobile computing device sends a request for personalization including those user credentials. After authenticating the user credentials, the personalization server sends the personalization data to the second mobile computing device, which installs the personalization data. Installing the personalization data establishes a configuration of the second mobile computing device corresponding to a previous configuration of the first mobile computing device. For increased convenience and security, the user credentials may be stored on a smart card or other security device. Other embodiments are described and claimed.

13 Claims, 5 Drawing Sheets

(51) Int. Cl.
*G06F 11/14* (2006.01)
*H04W 12/06* (2009.01)
*H04W 4/00* (2009.01)
*H04W 88/02* (2009.01)

(52) U.S. Cl.
CPC ...... *G06F 11/1461* (2013.01); *G06F 11/1469* (2013.01); *G06F 21/31* (2013.01); *H04L 63/08* (2013.01); *H04L 63/0853* (2013.01); *H04W 4/001* (2013.01); *H04W 12/06* (2013.01); *H04W 88/02* (2013.01)

(58) Field of Classification Search
USPC .................................................. 713/155
See application file for complete search history.

(56) References Cited

U.S. PATENT DOCUMENTS

| | | | | |
|---|---|---|---|---|
| 7,729,690 | B1* | 6/2010 | Huang | H04M 1/72522 455/412.1 |
| 7,802,306 | B1* | 9/2010 | Adams | G06F 21/10 713/155 |
| 7,810,145 | B2* | 10/2010 | Lehinger | G06F 21/6245 707/711 |
| 8,244,678 | B1* | 8/2012 | Hartland | H04L 67/1095 707/610 |
| 8,782,741 | B1* | 7/2014 | L'Heureux et al. | 726/3 |
| 9,002,789 | B2* | 4/2015 | Lehto | H04W 24/04 707/628 |
| 9,202,059 | B2* | 12/2015 | Bhansali | G06F 21/575 |
| 2002/0132612 | A1* | 9/2002 | Ishii | G06Q 30/02 455/414.1 |
| 2003/0134625 | A1* | 7/2003 | Choi | G06F 11/1456 455/418 |
| 2003/0196084 | A1* | 10/2003 | Okereke et al. | 713/156 |
| 2005/0102329 | A1* | 5/2005 | Jiang | G06F 11/1451 |
| 2005/0257072 | A1* | 11/2005 | Cross | H04L 63/06 713/193 |
| 2006/0095958 | A1* | 5/2006 | Lehinger et al. | 726/6 |
| 2006/0147043 | A1* | 7/2006 | Mann | H04L 41/0893 380/270 |
| 2006/0196931 | A1* | 9/2006 | Holtmanns et al. | 235/380 |
| 2008/0140959 | A1* | 6/2008 | Popell | G06F 1/1632 711/161 |
| 2008/0168245 | A1* | 7/2008 | De Atley | G06F 11/1451 711/162 |
| 2008/0177998 | A1* | 7/2008 | Apsangi | H04L 63/0428 713/155 |
| 2009/0041230 | A1* | 2/2009 | Williams | 380/28 |
| 2009/0088142 | A1* | 4/2009 | Baribault | H04M 3/42 455/418 |
| 2009/0106110 | A1 | 4/2009 | Stannard et al. | |
| 2009/0150979 | A1* | 6/2009 | Fujino | 726/4 |
| 2009/0222896 | A1* | 9/2009 | Ichikawa et al. | 726/6 |
| 2009/0298478 | A1* | 12/2009 | Tyhurst | H04L 67/34 455/414.1 |
| 2009/0307284 | A1* | 12/2009 | Welingkar | G06F 11/1451 |
| 2009/0307333 | A1* | 12/2009 | Welingkar | H04L 67/1095 709/219 |
| 2010/0088390 | A1* | 4/2010 | Bai | H04L 63/08 709/217 |
| 2010/0095217 | A1* | 4/2010 | Kang | H04M 1/274516 715/738 |
| 2010/0125522 | A1* | 5/2010 | Thomas | G06Q 20/20 705/44 |
| 2010/0210240 | A1 | 8/2010 | Mahaffey et al. | |
| 2010/0223400 | A1* | 9/2010 | McCarthy | H04L 67/1097 709/248 |
| 2010/0281059 | A1* | 11/2010 | Lynch | 707/784 |
| 2010/0313018 | A1* | 12/2010 | Jorgensen | H04L 63/08 713/168 |
| 2010/0313066 | A1* | 12/2010 | Hanes | G06F 11/1464 714/6.12 |
| 2010/0332744 | A1* | 12/2010 | Khosravi | G06F 21/6218 711/112 |
| 2011/0076986 | A1* | 3/2011 | Glendinning et al. | 455/411 |
| 2011/0218964 | A1* | 9/2011 | Hagan | G06F 17/30581 707/626 |
| 2011/0218965 | A1* | 9/2011 | Lee et al. | 707/640 |
| 2011/0295980 | A1* | 12/2011 | Aldis | H04N 21/26258 709/219 |
| 2012/0060031 | A1* | 3/2012 | Huang et al. | 713/168 |
| 2012/0331566 | A1* | 12/2012 | Lection et al. | 726/28 |
| 2013/0006869 | A1* | 1/2013 | Grab et al. | 705/51 |
| 2013/0047084 | A1* | 2/2013 | Sanders et al. | 715/716 |
| 2013/0173556 | A1* | 7/2013 | Grigg | H04L 67/04 707/667 |
| 2013/0283038 | A1* | 10/2013 | Kulkarni | H04L 63/065 713/153 |
| 2013/0318207 | A1* | 11/2013 | Dotter | H04L 29/08117 709/219 |
| 2014/0165151 | A1* | 6/2014 | Welday, Jr. | H04L 63/08 726/4 |
| 2014/0230038 | A1* | 8/2014 | Leong et al. | 726/7 |
| 2015/0039891 | A1* | 2/2015 | Ignatchenko | G06F 21/575 713/171 |
| 2015/0244837 | A1* | 8/2015 | Jadhav | H04L 12/6418 709/203 |

FOREIGN PATENT DOCUMENTS

| | | | | |
|---|---|---|---|---|
| JP | 2003309669 A | | 10/2003 | |
| JP | 2006-033199 A | | 2/2006 | |
| JP | 2011243017 A | | 12/2011 | |
| KR | 101171210 B1 | | 8/2012 | |
| KR | 2012/003529 | * | 11/2012 | ............ 713/193 |

OTHER PUBLICATIONS

"Remote backup service," Wikipedia, The Free Encyclopedia, retrieved from: <http://en.wikipedia.org/w/index.php?title=Remote_backup_service&oldid=499342980>, edited Jun. 25, 2012, 6 pages.

International Search Report and Written Opinion received for PCT International Application No. PCT/US2014/018674, mailed Jul. 17, 2014, 13 pages.

European Search Report for Application No. 14780280.5-1870/2973187, dated Sep. 1, 2016, 10 pages.

Reasons for Rejection and English Translation for Japanese Application No. 2015-558232, dated Oct. 4, 2016, 6 pages.

* cited by examiner

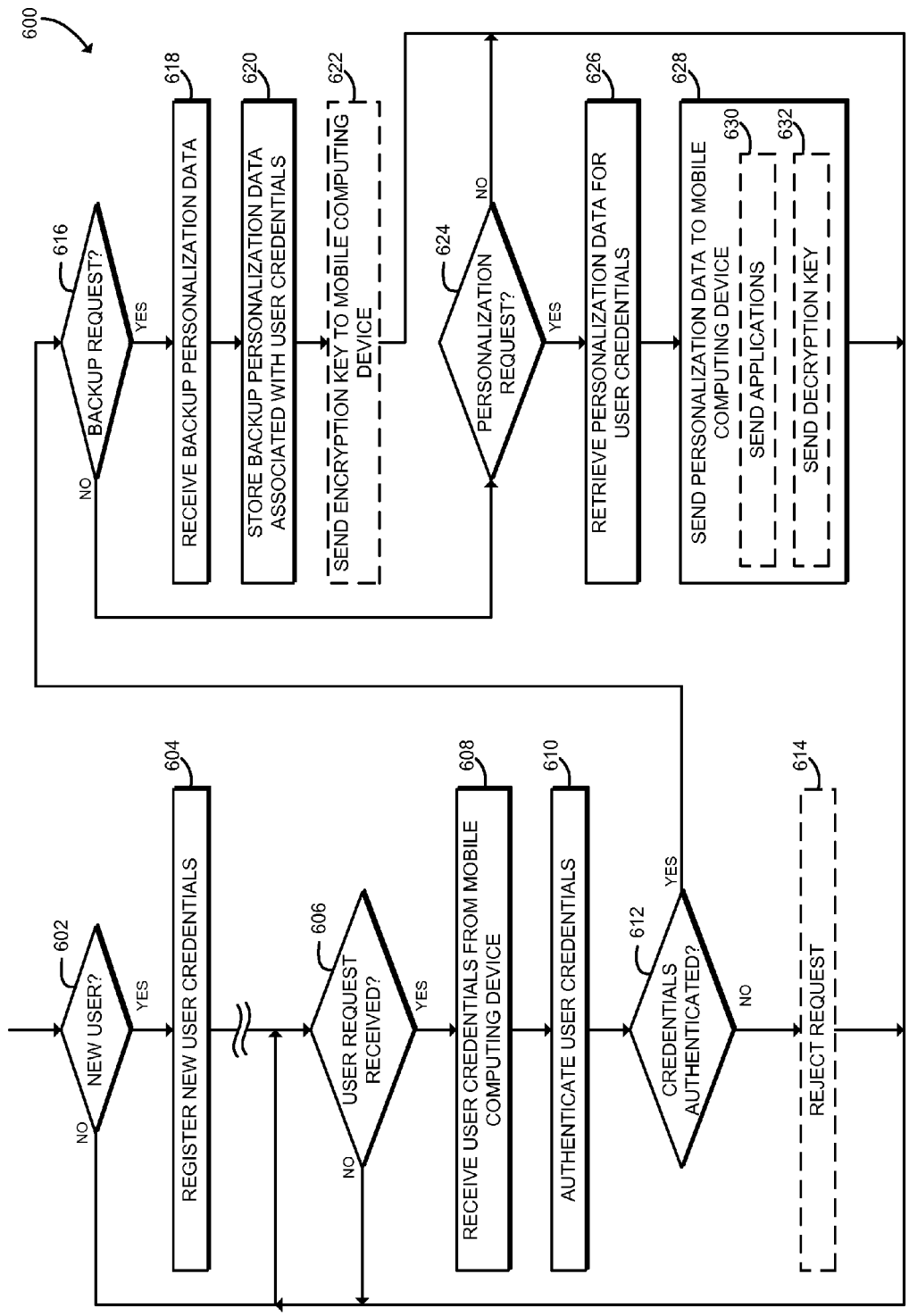

ONE-TOUCH DEVICE PERSONALIZATION

BACKGROUND

Mobile devices such as smartphones and tablet computers are increasingly becoming primary personal computing devices. Their portability and convenience encourage frequent usage across a wide variety of applications. In use, mobile devices tend to become highly personalized to a particular user, accumulating numerous configuration and personalization settings as well as detailed usage data.

Mobile devices are also subject to relatively short product lifecycles. Available mobile processing power and storage space are quickly increasing, which accelerates device obsolescence and encourages rapid upgrade cycles. Mobile devices themselves typically do not include user-serviceable or upgradeable components, meaning that the entire device is usually replaced. Additionally, many mobile devices are subsidized by cellular carriers with the purchase of a contract, encouraging upgrades with every contract cycle, typically every two years. Some settings and applications may be transferred from a typical mobile device to a new device by synchronizing both devices with a personal computer. Full personalization data, including saved passwords and usage information, is typically not transferred. Further, settings and applications typically may not be transferred to a new mobile device running a different operating system or featuring a different processor architecture.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a simplified flow diagram of at least one embodiment of a method for one-touch device personalization that may be executed by the personalization server of FIGS. 1 and 3.

DETAILED DESCRIPTION OF THE DRAWINGS

Figure 1:
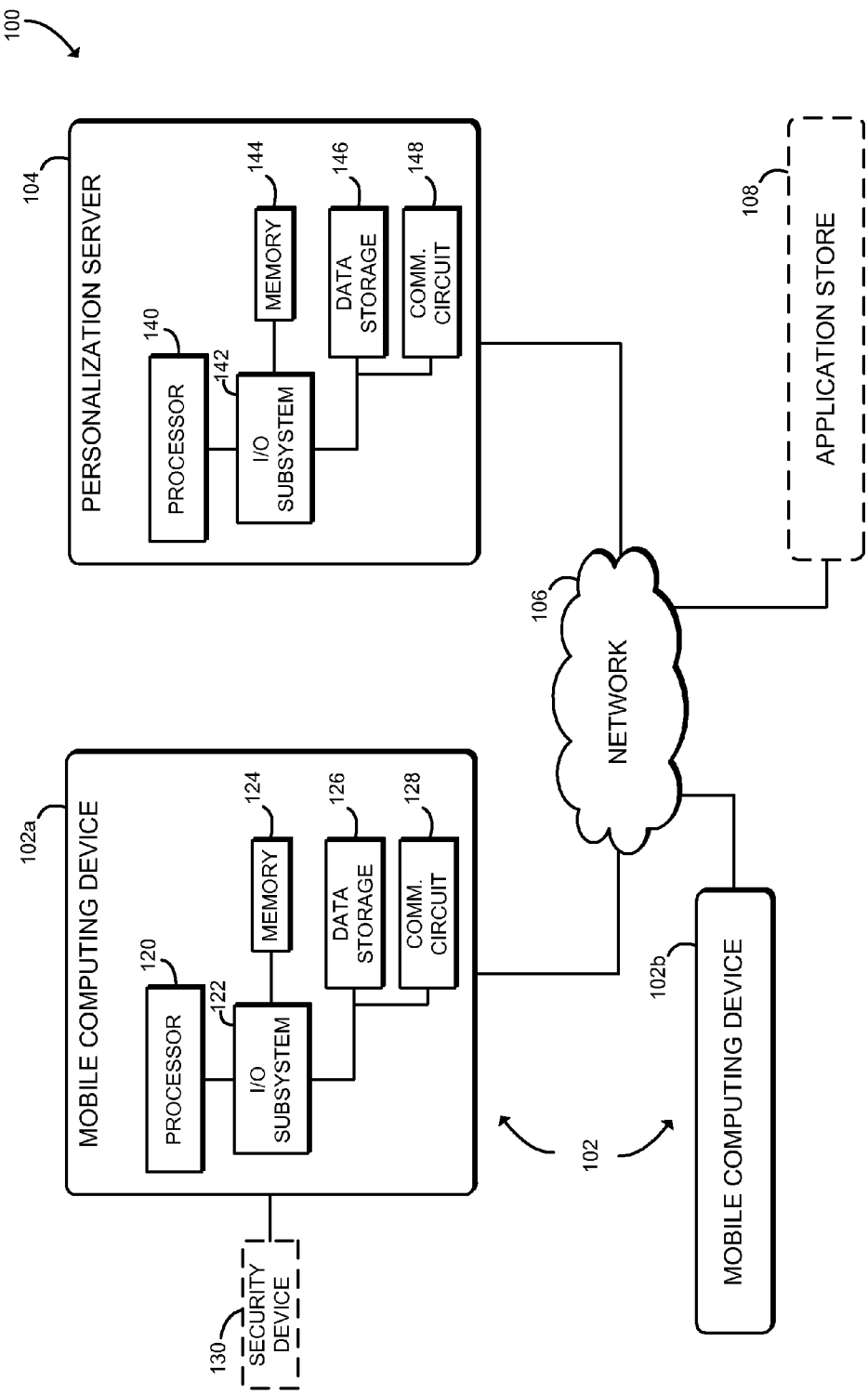
FIG. 1 is a simplified block diagram of at least one embodiment of a system for one-touch device personalization for a mobile computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for one-touch device personalization includes multiple mobile computing devices 102 and a personalization server 104 in communication with each other over a network 106. The system 100 may further include an application store 108 coupled to the network 106. In use, as discussed in detail below, a current mobile computing device 102a backs up personalization settings of a user of the current mobile computing device 102a to the personalization server 104. These personalization settings are associated with credentials that may be authenticated by the personalization server 104. Some time later, a new mobile computing device 102b is put into service. The new mobile computing device 102b contacts the personalization server 104, provides the same credentials to the personalization server 104, and receives the previously backed-up personalization settings. The new mobile computing device 102b is subsequently personalized and ready for use.

Thus, the disclosed technologies allow for "one-touch" personalization of new mobile computing devices 102; that is, personalization of each mobile computing device 102 may be initiated with a single user interaction. Such one-touch personalization increases productivity and improves user experience when users activate new devices. Further, by storing device personalization settings on a separate personalization server 104, a mobile computing device 102 that is lost, stolen, destroyed, or otherwise inoperable may be more easily replaced. Additionally, the personalization settings may be stored in an operating-system-independent or device-independent format, allowing users to more easily upgrade devices and change operating systems, helping users take advantage of advances in mobile computing devices and/or avoid vendor lock-in.

Referring again to FIG. 1, each mobile computing device 102 may be embodied as any type of mobile computing device capable of performing the functions described herein. For example, each mobile computing device 102 may be embodied as, without limitation, a computer, a smart phone, a tablet computer, a laptop computer, a notebook computer, a mobile computing device, a cellular telephone, a handset, a messaging device, a vehicle telematics device, a network appliance, a web appliance, a distributed computing system, a multiprocessor system, a processor-based system, a consumer electronic device, a digital television device, and/or any other computing device configured to plan for future device context. As shown in FIG. 1, the illustrative mobile computing device 102a includes a processor 120, an input/output subsystem 122, a memory 124, a data storage device 126, and a communication circuit 128. Of course, the mobile computing device 102a may include other or additional components, such as those commonly found in a notebook computer (e.g., various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the mobile computing device 102a such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the mobile computing device 102a. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the mobile computing device 102a, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. As discussed in more detail below, the data storage device 126 may store device personalization and customization settings such as configuration files, application data, applications, and the like.

The communication circuit 128 of the mobile computing device 102a may be embodied as any type of communication circuit, device, or collection thereof, capable of enabling communications between the mobile computing device 102a, the personalization server 104, and/or other remote devices. The communication circuit 128 may be configured to use any one or more communication technology (e.g., wireless or wired communications) and associated protocols (e.g., Ethernet, Bluetooth®, Wi-Fi®, WiMAX, etc.) to effect such communication.

In some embodiments, the mobile computing device 102a may be coupled to, or otherwise in communication with, a security device 130 separate from the mobile computing device 102a. The security device 130 may be embodied as a smart card, security token, biometric reader, or any other device useable to authenticate the user of the mobile computing device 102a. In some embodiments, the security device 130 may additionally provide secure data storage for personalization settings. Additionally, in some embodiments, the security device 130 may be coupled to the mobile computing device 102a using the communication circuit 128. For example, the mobile computing device 102a may communicate with a smart card using a near-field communication (NFC) capability of the communication circuit 128. In other embodiments, the security device 130 may be coupled to the mobile computing device 102a using a peripheral I/O connection such as a universal serial bus ("USB").

The illustrative new mobile computing device 102b may include components and features similar to the mobile computing device 102a such as a processor, I/O subsystem, memory, data storage, communication circuitry, and various peripheral devices, which are not illustrated in FIG. 1 for clarity of the present description. However, although the mobile computing device 102b is similar to the mobile computing device 102a, in some embodiments the two mobile computing devices 102 may include different operating systems, processor architectures, form factors, or the like. Additionally, although the mobile computing device 102b has been referred to herein as the "new" mobile computing device, it should be appreciated that the new mobile computing device 102b may be an older version or product relative to the current mobile computing device 102a. That is, the new mobile computing device 102b may be new to the user, but not necessarily new to the marketplace.

As discussed in more detail below, each mobile computing device 102 is configured to transmit and receive data with the personalization server 104 and/or the application store 108 over the network 106. The network 106 may be embodied as any number of various wired and/or wireless networks. For example, the network 106 may be embodied as, or otherwise include, a wired or wireless local area network (LAN), a wired or wireless wide area network (WAN), and/or a publicly-accessible, global network such as the Internet. As such, the network 106 may include any number of additional devices, such as additional computers, routers, and switches, to facilitate communications between each mobile computing device 102 and the other devices of the system 100.

The personalization server 104 may be embodied as any type of server computing device, or collection of devices, capable of performing the functions described herein. As such, the personalization server 104 may be embodied as a single server computing device or a collection of servers and associated devices. For example, in some embodiments, the personalization server 104 is embodied as a cloud database service to perform the functions described herein. In such embodiments, the personalization server 104 may be embodied as a "virtual server" formed from multiple computing devices distributed across the network 106 and operating in a public or private cloud. Accordingly, although the personalization server 104 is illustrated in FIG. 1 and described below as embodied as a single server computing device, it should be appreciated that the personalization server 104 may be embodied as multiple devices cooperating together to facilitate the functionality described below. Illustratively, the personalization server 104 includes a processor 140, an I/O subsystem 142, a memory 144, a data storage 146, a communication circuit 148, and/or other components and devices commonly found in a computer server or similar computing device. Those individual components of the personalization server 104 may be similar to the corresponding components of the mobile computing device 102a, the description of which is applicable to the corresponding components the personalization server 104 and is not repeated herein so as not to obscure the present disclosure.

In some embodiments, the application store 108 is configured to provide applications to the mobile computing devices 102 and/or the personalization server 104, as described in detail below. As such, the application store 108 may include components and features similar to a mobile computing device 102 and/or the personalization server 104, such as a processor, I/O subsystem, memory, data storage, communication circuitry, and various peripheral devices, which are not illustrated in FIG. 1 for clarity of the present description. The application store 108 may be controlled or operated by a third party, different from the user of a mobile computing device 102 or the operator of the personalization server 104, such as a device manufacturer or software vendor. Further, although the illustrative system 100 of FIG. 1 includes one application store 108, it should be understood that any number of application stores 108 may interact with the system 100.

Figure 2:
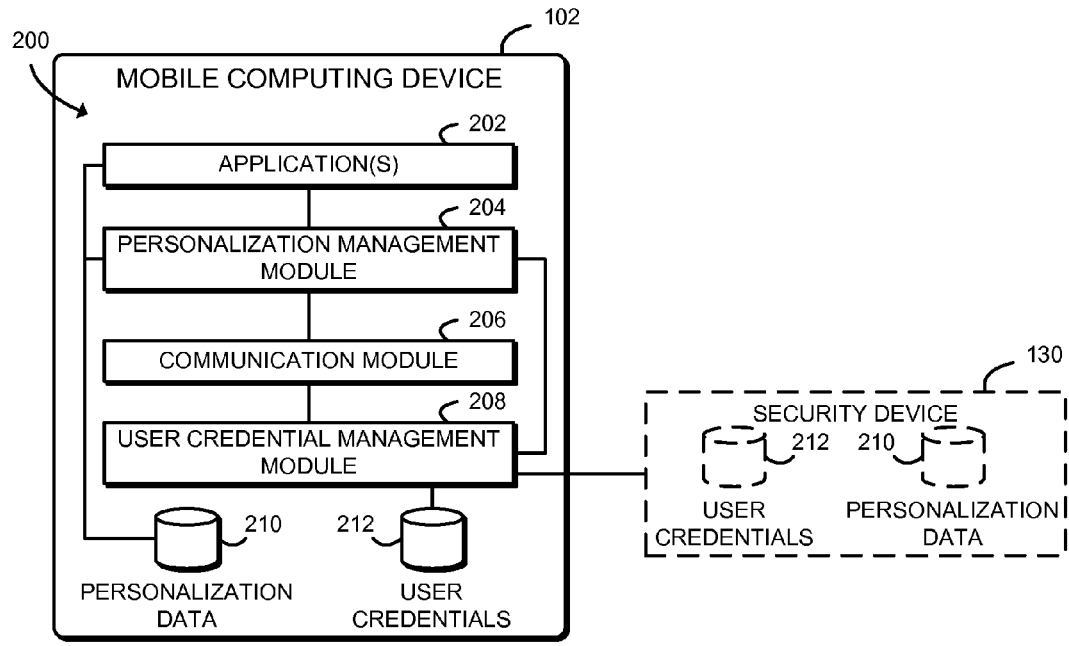
FIG. 2 is a simplified block diagram of at least one embodiment of an environment of a mobile computing device of the system of FIG. 1.

Referring now to FIG. 2, in the illustrative embodiment, each mobile computing device 102 establishes an environment 200 during operation. The illustrative embodiment 200 includes one or more applications 202, a personalization management module 204, a communication module 206, a user credential management module 208, personalization data 210, and user credentials 212. The various modules of the environment 200 may be embodied as hardware, firmware, software, or a combination thereof.

The user credential management module 208 is configured to determine user credentials 212 associated with the personalization server 104. The user credential management module 208 may prompt the user for the user credentials 212 or may retrieve the user credentials 212 from the physical security device 130. The user credentials 212 may be embodied as a username and password, a digital certificate, or other data useable to identify and authenticate the user of the mobile computing device 102.

The communication module 206 is configured to send requests to the personalization server 104 to receive the personalization data 210 and to back up the personalization data 210 as discussed below. Such requests include the user credentials 212, which are sent to allow the personalization server 104 to retrieve personalization data 210 associated with the user credentials 212.

The personalization data 210 includes user-specific personalization and customization settings for the mobile computing device 102 and the applications 202. Such personalization data 210 may include device configuration settings, network connectivity settings, enterprise account settings, passwords and other credentials, installed applications 202, application settings, contact information, and/or other data defining various configurations or personalization settings of the mobile computing device 102. The personalization data 210 may also include application usage data generated by the applications 202 in use, such as transaction history, bookmarks, status information, and the like. Thus, the personalization data 210 is updated over time as the mobile computing device 102 is used.

The personalization management module 204 is configured to install and configure the personalization data 210 received from the personalization server 104 and to monitor the personalization data 210 for changes so as to back up to the personalization server 104. The personalization management module 204 may receive the personalization data 210 in an operating-system-independent or device-independent format and convert the personalization data 210 to a native format of the mobile computing device 102. In some embodiments, the personalization management module 204 may store and retrieve the personalization data 210 from the security device 130 in an encrypted format.

The applications 202 may include any typical mobile applications such as communications applications, media applications, social networking applications, productivity applications, and enterprise applications. In use, the user of the mobile computing device 102 interacts with the applications 202, generating additional or updated personalization data 210. The identity of the particular applications 202 installed on the mobile computing device 102 may also be included in the personalization data 210 and managed by the personalization management module 204.

Figure 3:
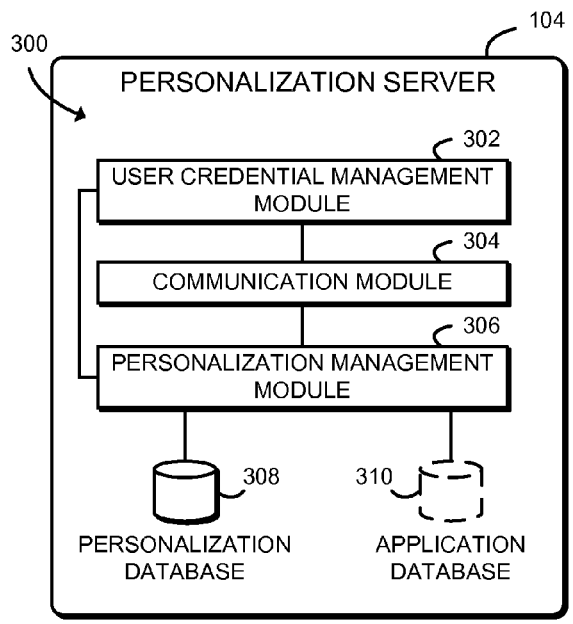
FIG. 3 is a simplified block diagram of at least one embodiment of an environment of a personalization server of the system of FIG. 1.

Referring now to FIG. 3, in the illustrative embodiment, the personalization server 104 establishes an environment 300 during operation. The illustrative embodiment 300 includes a user credential management module 302, a communication module 304, a personalization management module 306, a personalization database 308, and in some embodiments an application database 310. The various modules of the environment 300 may be embodied as hardware, firmware, software, or a combination thereof.

The communication module 304 is configured to receive requests from one or more mobile computing devices 102 to backup personalization data 210 or to retrieve personalization data 210. The communication module 304 is further configured to receive user credentials 212 from one or more mobile computing devices 102 as part of the requests.

The user credential management module 302 is configured to authenticate the user credentials 212 received by the communication module 304. The user credentials 212 may be authenticated against accounts maintained by the personalization server 104 or by using an external authentication server (not illustrated).

The personalization management module 306 is configured to retrieve personalization data 210 stored in the personalization database 308 in response to requests received by the communication module 304. The personalization management module 306 is further configured to back up personalization data 210 received by the communication module 304 into the personalization database 308.

The personalization database 308 is configured to store personalization data 210 indexed by user credentials 212. That is, the personalization database 308 stores personalization data 210 together with associations between personalization data 210 and user credentials 212. Additionally, the personalization database 308 may retrieve personalization data 210 based on associated user credentials 212. The personalization database 308 may include personalization data 210 generated by numerous mobile computing devices 102. The personalization database 308 therefore may store the personalization data 210 in an operating-system-independent or device-independent format. The personalization database 308 may be embodied as a relational database, a cloud storage service, a flat file, or any other data storage capable of storing the personalization data 210 indexed by user credentials 212.

The application database 310 stores one or more applications 202 that may be installed on a mobile computing device 102. The application database 310 may store the applications 202 themselves or may store pointers to the locations of the applications 202, for example on the application store 108. If stored directly in the application database 310, the applications 202 may be stored in binary format, device-independent bytecode format, source code format, or any other format usable by the mobile computing device 102. The application database 310 may include multiple versions of each application 202 tailored for particular types or models of the mobile computing device 102. In some embodiments, the communication module 304 may transfer applications 202 from the application database 310 to the mobile computing device 102.

Figure 4:
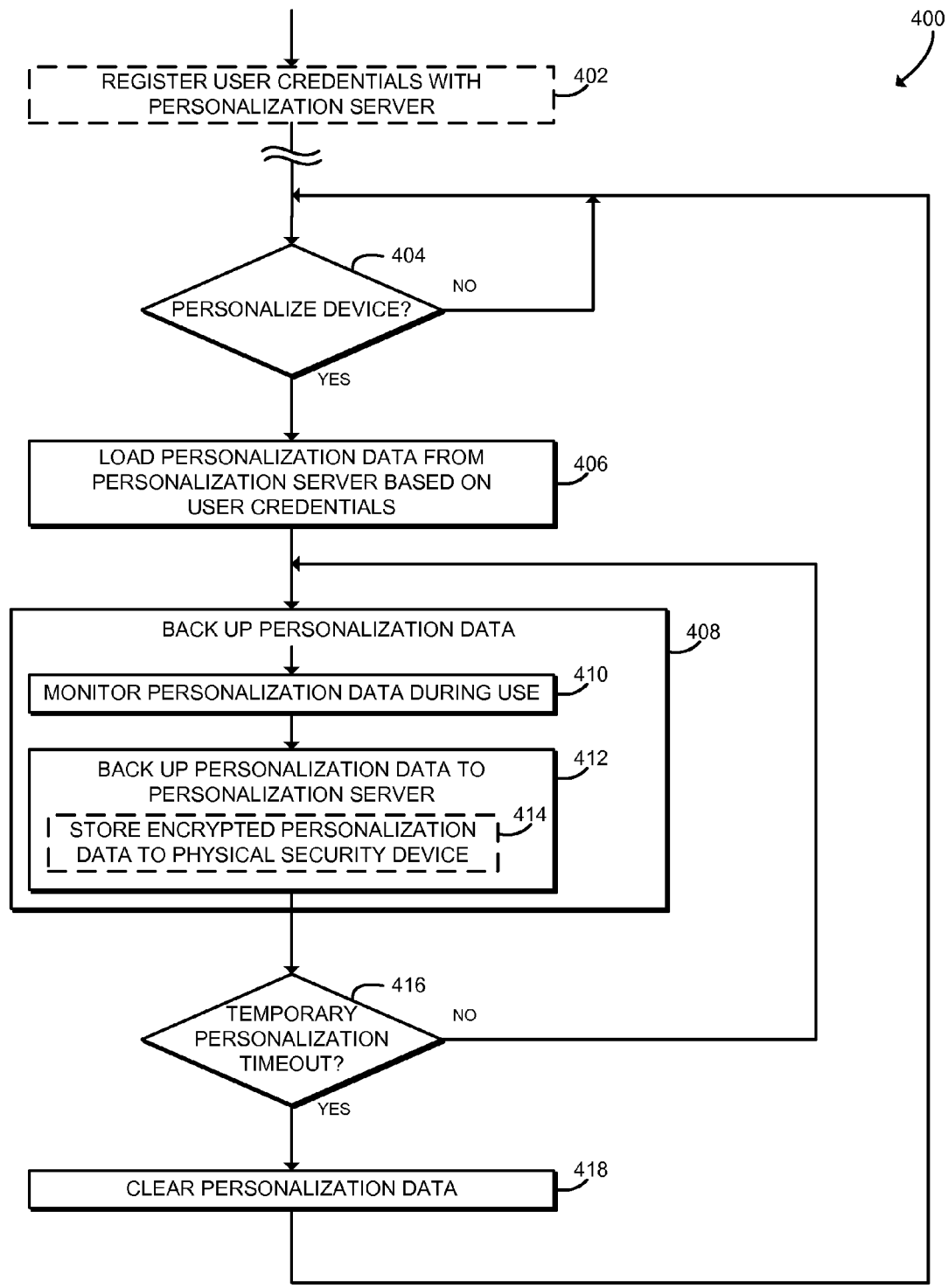
FIG. 4 is a simplified flow diagram of at least one embodiment of a method for one-touch device personalization that may be executed by the mobile computing device of FIGS. 1 and 2.

Referring now to FIG. 4, in use, each mobile computing device 102 may execute a method 400 for one-touch personalization. The method 400 begins with block 402, in which in some embodiments the mobile computing device 102 registers a set of user credentials 212 with the personalization server 104. The user credentials 212 will be associated with the personalization data 210 for storage and retrieval. As such, the user credentials 212 need only be registered with the personalization server 104 once. Such registration may be performed ahead of time by a different mobile computing device 102 or through another registration process (not illustrated). Such user credentials 212 may be associated with an account maintained on the personalization server 104, an enterprise account, or an account provided by a third party such as an email account. The user credentials 212 may be embodied as a username and password, a digital certificate, or any other data useable to securely authenticate the user of the mobile computing device 102 and index the personalization data 210.

After some time, in block 404, the mobile computing device 102 determines whether to perform device personalization. Prior to device personalization, the mobile computing device 102 may be configured in a default or un-owned state. In such state, the mobile computing device 102 may be unable to execute applications 202 and otherwise generally inoperable. In some embodiments, the mobile computing device 102 may be usable only for limited purposes, for example to place an emergency call (i.e., a "911" call). In such default state, the mobile computing device 102 may display a user interface prompting the user to initiate device personalization. Such user interface may also provide personalization options, including selection of the user credentials 212 and selection of temporary personalization, as described in detail below. Alternatively or in addition to user input, such personalization options may be set by device or organization policy. Further, in some embodiments, the mobile computing device 102 may be in an operable state, but configured with a different user's personalization. If the mobile computing device 102 determines not to perform personalization, the method 400 loops back to continue waiting to initiate device personalization. If the mobile computing device 102 determines to perform personalization, the method 400 advances to block 406.

In block 406, the mobile computing device 102 loads personalization data 210 from the personalization server 104 based on the user credentials 212. After loading the personalization data 210, the configuration of the mobile computing device 102 may correspond to a previous configuration of a different mobile computing device 102. As such, the mobile computing device 102 is ready for use. In some embodiments, the mobile computing device 102 may execute a method 406 to load the personalization data 210 as illustrated in FIG. 5.

Figure 5:
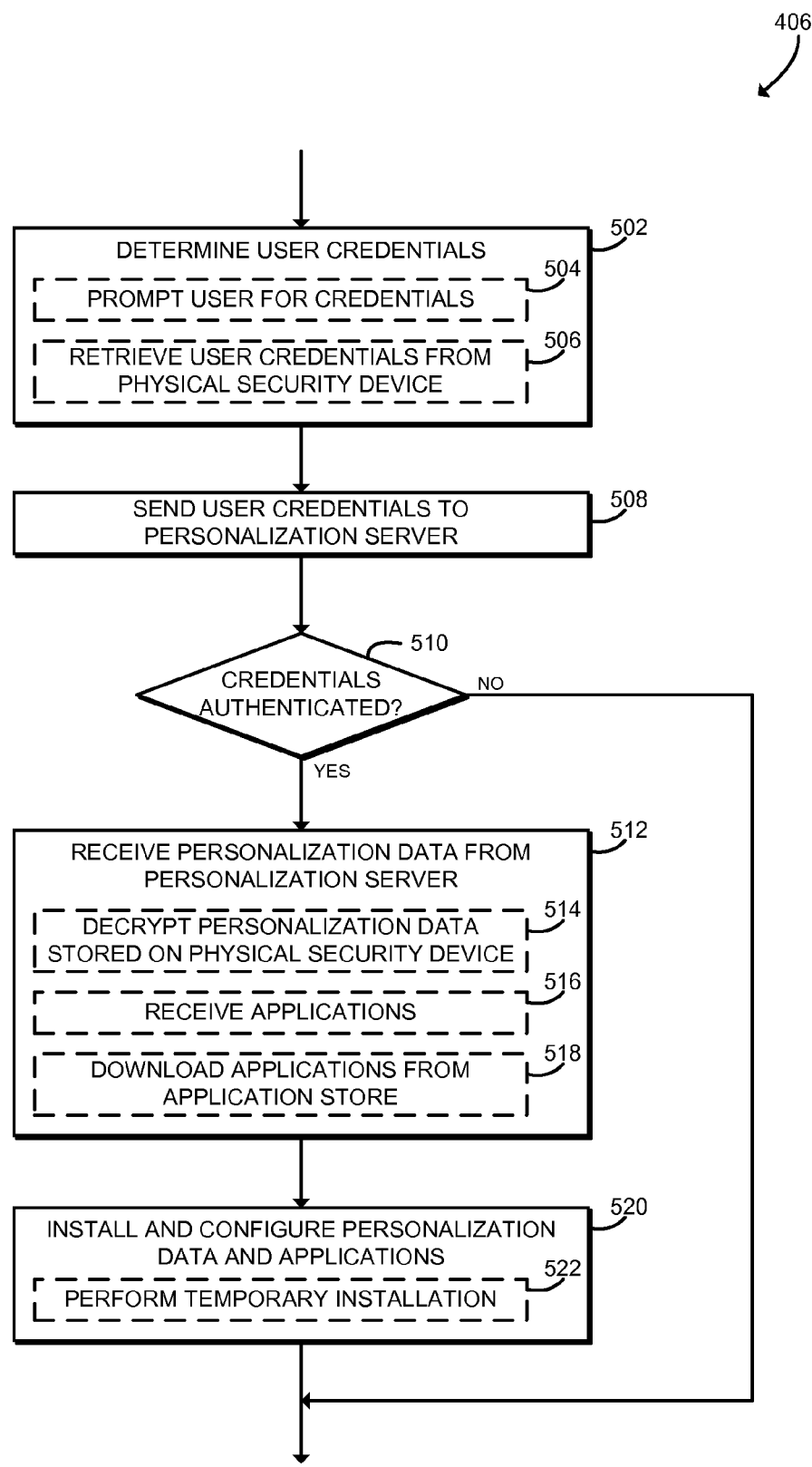
FIG. 5 is a simplified flow diagram of at least one embodiment of a method for loading personalization data that may be executed by the mobile computing device of FIGS. 1 and 2.

Referring now to FIG. 5, the method 406 begins with block 502, in which the mobile computing device 102 determines the user credentials 212 associated with the personalization server 104. In some embodiments, in block 504 the mobile computing device 102 prompts the user for the user credentials 212. As described above, when in the default, un-owned state, the mobile computing device 102 may provide a user interface to collect user credentials 212 and initiate device personalization. In such embodiments, the user may power on the mobile computing device 102 for the first time and immediately enter the user credentials 212 in such user interface. In some embodiments, in block 506 the mobile computing device 102 retrieves the user credentials 212 from the physical security device 130. As described above, the user credentials 212 may be embodied as a username and password, a digital certificate, or other data stored on the security device 130. In such embodiments, the user may power on the mobile computing device 102 for the first time and immediately connect the security device 130 to initiate device personalization. For example, the user may tap an NFC-enabled smart card against the mobile computing device 102 to provide the user credentials 212 stored on the smart card. As another example, the user may tap a different mobile computing device 102 that is also NFC-enabled against the mobile computing device 102 to provide the user credentials 212 stored on the different mobile computing device 102. As still another example, the user may connect a USB memory card to the mobile computing device 102 to provide the user credentials 212 stored on the memory card.

In block 508, the mobile computing device 102 sends the user credentials 212 to the personalization server 104. The user credentials 212 may be sent as part of a request for personalization sent to the personalization server 104. Such personalization request may be transmitted using any communication protocol supported by the mobile computing device 102 and the personalization server 104. In block 510, the mobile computing device 102 determines whether the user credentials 212 were successfully authenticated by the personalization server 104. Such determination may be based on error codes or other responses received from the personalization server 104. If not authenticated, the method 406 returns. In some embodiments, failure to authenticate may trigger an exception or other error state causing the configuration of the mobile computing device 102 to revert to the default, un-owned state. If authenticated, the method 406 advances to block 512.

In block 512, the mobile computing device 102 receives the personalization data 210 from the personalization server 104. As described above, the personalization data 210 includes configuration settings, application settings, and usage information associated with the user credentials 212. Of course, for user credentials 212 used for the first time, the personalization data 210 may be empty or non-existant. In such circumstances, the configuration of the mobile computing device 102 may be left unchanged. Where personalization data 210 exists, the personalization data 210 may have originated from one or more mobile computing devices 102 other than the mobile computing device 102. Accordingly, such personalization data 210 as received from the personalization server 104 may be stored in an operating-system- and device-independent format. For example, the personalization data 210 may be represented in a text-based format or in an XML-based interchange format.

In some embodiments, in block 514, the mobile computing device 102 decrypts personalization data 210 stored on the physical security device 130. As described above, such personalization data 210 may have been encrypted with an encryption key that was hashed, encrypted, or otherwise packaged using the user credentials 212. In some embodiments, the personalization server 104 may similarly hash, encrypt, or otherwise package a decryption key that is sent to the mobile computing device 102 as part of the personalization data 210 sent in response to the request for personalization. In such embodiments, the personalization data 210 sent by the personalization server 104 may include only the decryption key. In other embodiments, the mobile computing device 102 may decrypt the personalization data 210 by unhashing a stored decryption key using the user credentials 212, thus allowing the personalization data 210 to be decrypted without further network communication with the personalization server 104. Such encryption may be symmetric or asymmetric, meaning that the encryption and decryption keys may be the same or different keys.

In some embodiments, in block 516 the mobile computing device 102 may receive one or more applications 202 from the personalization server 104. In some embodiments, in block 518 the mobile computing device 102 may download one or more applications 202 from the application store 108. The mobile computing device 102 may determine the applications 202 for download based on the personalization data 210 provided by the personalization server 104.

In block 520, the mobile computing device 102 installs and configures the personalization data 210 and any associated applications 202. After installation, the configuration of the mobile computing device 102 may correspond to a previous configuration of a different mobile computing device 102 that originated the personalization data 210. Accordingly, after installation and configuration, the mobile computing device 102 may be used as a replacement for a different mobile computing device 102 that is being upgraded or that has been lost, stolen, or destroyed. Of course, on first use of the user credentials 212, the configuration of the mobile computing device 102 will not change. As part of the installation process, the mobile computing device 102 may translate operating-system-independent or device-independent personalization data 210 into the particular configuration settings and data files required by the mobile computing device 102. The applications 202 may similarly be installed and configured using the personalization data 210.

In some embodiments, in block 522 the mobile computing device 102 may perform a temporary installation of the personalization data 210 and the applications 202. As described above, when requesting personalization, the user or appropriate policy may specify temporary personalization. For temporary installation, the personalization data 210 and the applications 202 may be installed as normal, or they may be installed in a temporary environment of the mobile computing device 102 such as a virtualization partition. As part of such temporary installation, the mobile computing device 102 may set a timeout that will trigger deletion of the personalization data 210, as described above. After completing installation and configuration, the method 406 returns.

Referring back to FIG. 4, in block 408, the mobile computing device 102 backs up the personalization data 210 to the personalization server 104. In block 410, the mobile computing device 102 monitors the personalization data 210 during use to identify any changes to the personalization data 210. For example, the mobile computing device 102 may monitor user activity in one or more of the applications 202 for changes to configuration settings, saved data, or the like.

In block 412, the mobile computing device 102 backs up the personalization data 210 to the personalization server 104. In some embodiments, the mobile computing device 102 may send a subset of the personalization data 210 that has been updated or changed to the personalization server 104. In some embodiments, the mobile computing device 102 may send all personalization data 210 to the personalization server 104. As part of the backup process, the mobile computing device 102 sends a backup request to the personalization server 104 including the user credentials 212, which are used for authentication and to associate with the personalization data 210 for later retrieval. The backup process may be initiated when the personalization data 210 has changed, or may be initiated at scheduled times or according to some other backup scheme. After such personalization data 210 has been backed up to the personalization server 104, such personalization data 210 is thus available to personalize a different mobile computing device 102.

In block 414, in some embodiments the mobile computing device 102 stores encrypted personalization data 210 to the physical security device 130. The mobile computing device 102 may store all of the personalization data 210, or a subset of the personalization data 210. The amount of encrypted personalization data 210 to be stored may depend on the storage capacity of the security device 130. The mobile computing device 102 may encrypt the personalization data 210 using an encryption key received from the personalization server 104. Such encryption key may be hashed, encrypted, or otherwise packaged using the user credentials 212 such that only the authorized user of the mobile computing device 102 may access the personalization data 210.

In block 416, the mobile computing device 102 determines whether a temporary personalization timeout has occurred. As described above, the personalization data 210 may be installed temporarily. Accordingly, the mobile computing device 102 may track elapsed time since personalization and trigger a timeout when a preset time limit has expired. For example, the mobile computing device 102 may be issued to the user for a temporary assignment with a preset time limit corresponding to the length of the assignment. In some embodiments, the mobile computing device 102 may additionally prompt the user upon expiration of the timeout to determine if the mobile computing device 102 is still in use. Of course, if the personalization data 210 was installed permanently, no temporary timeouts will occur. If the timeout has not occurred, the method 400 loops back to block 408 to continue backing up the personalization data 210 to the personalization server 104. If the timeout has occurred, the method 400 advances to block 418.

In block 418, the mobile computing device 102 clears the personalization data 210. The mobile computing device 102 clears all personalization data 210, including data originally loaded from the personalization server 104 and any changes made by the mobile computing device 102. In doing so, the configuration of the mobile computing device 102 reverts to an earlier state—the default or un-owned state—thus making the mobile computing device 102 ready for further personalization. In some embodiments, the mobile computing device 102 may clear the personalization data 210 by performing a factory reset, that is, by deleting the personalization data 210 and reinstalling an operating system with default settings. In some embodiments, the mobile computing device 102 may securely delete or "wipe" the personalization data 210. Note that the mobile computing device 102 may not, in some embodiments, clear any encrypted personalization data 210 stored on the security device 130, allowing such security device 130 to be used with a different mobile computing device 102. After clearing the personalization data 210, the method 400 loops back to block 404 to await further personalization.

Referring now to FIG. 6, in use, the personalization server 104 may execute a method 600 for personalization of one or more mobile computing devices 102. The method 600 beings with block 602, in which the personalization server 104 determines whether a new user is registering. If no new user is registering, the method 600 skips ahead to block 606. If a new user is registering, the method 600 advances to block 604. In block 604, the personalization server 104 registers new user credentials 212. The new user credentials 212 may be generated by the personalization server 104, for example as part of creating a user account managed by the personalization server 104, or may be supplied by the user. Further, such registration may include preparing the personalization database 308 to store personalization data 210 associated with the new user credentials 212. As described above, user credentials 212 may be embodied as a username and password, a digital certificate, or any other data useable to securely authenticate the user of a mobile computing device 102 and index the personalization database 308.

After some time, in block 606, the personalization server 104 determines whether a request has been received from a mobile computing device 102. If no request has been received, the method 600 loops back and continues waiting for requests. If a request has been received, the method 600 advances to block 608.

In block 608, the personalization server 104 receives the user credentials 212 from the mobile computing device 102. The user credentials 212 may be provided as part of the initial request from the mobile computing device 102 or may be provided in a subsequent communication. In block 610, the personalization server 104 authenticates the user credentials 212. Such authentication may include any process to confirm that the user credentials 212 have been provided by an authorized user of the mobile computing device 102, such as checking provided passwords, verifying digital signatures, or the like.

In block 612, the personalization server 104 determines whether the user credentials 212 were successfully authenticated. If authenticated, the method 600 branches to block 616 as described below. If not authenticated, the method 600 advances to block 614. In some embodiments, in block 614 the personalization server 104 rejects the request received from the mobile computing device 102. The personalization server 104 may, for example, send an error message to the mobile computing device 102 or drop a network connection to the mobile computing device 102. After block 614, the method 600 loops back to block 606 to await further requests from a mobile computing device 102.

Referring back to block 612, if the user credentials 212 were successfully authenticated, the method 600 branches to block 616. In block 616, the personalization server 104 determines whether the request received from the mobile computing device 102 is to back up personalization data 210. If not, the method 600 branches to block 624 as described below. If a backup request was received, the method 600 advances to block 618.

In block 618, the personalization server 104 receives backup personalization data 210 from the mobile computing device 102. Such backup personalization data 210 may include all of the personalization data 210 stored on the mobile computing device 102, or only a portion of the personalization data 210, such as personalization data 210 changed since the last backup request. The personalization data 210 may be in an operating-system-independent or device-independent data format, or may be in a format specific to the particular mobile computing device 102.

In block 620, the personalization server 104 stores the personalization data 210 received from the mobile computing device 102 in the personalization database 308, including an association with the user credentials 212. The personalization server 104 may convert the personalization data 210 received from the mobile computing device 102 into an operating system-independent or device-independent data format before storage. By associating the personalization data 210 with the user credentials 212, the personalization database 308 makes the personalization data 210 available to mobile computing devices 102 other than the particular mobile computing device 102 that originated the personalization data 210.

In some embodiments, in block 622 the personalization server 104 sends an encryption key to the mobile computing device 102. As described above, the mobile computing device 102 may use such encryption key to encrypt part or all of the personalization data 210 on the security device 130. The personalization server 104 may hash, encrypt, or otherwise securely package the encryption key using the user credentials 212. Following block 622, the method 600 loops back to block 606 to await further requests from a mobile computing device 102.

Referring back to block 616, if a backup request was not received, then the method 600 branches to block 624. In block 624, the personalization server 104 determines whether a personalization request was received from the mobile computing device 102. If not, then the personalization server 104 received an unknown request. In other embodiments, not illustrated, the personalization server 104 may support additional types of requests. In the illustrated embodiment, if a personalization request was not received, the method 600 loops back to block 606 to await further requests. However, in some embodiments, the personalization server 104 may report an exception or other error condition. If a personalization request was received, then the method 600 advances to block 626.

In block 626, the personalization server 104 retrieves personalization data 210 associated with the user credentials 212 from the personalization database 308. In block 628, the personalization server 104 sends the personalization data 210 to the mobile computing device 102. Such mobile computing device 102 may be a new device or a device otherwise different from the mobile computing device 102 that originated the personalization data 210. In some embodiments, the personalization server 104 may send the personalization data 210 in the operating-system-independent or device-independent format in which it is stored in the personalization database 308. In other embodiments, the personalization server 104 may convert the personalization data 210 into a format appropriate for the particular mobile computing device 102. In some embodiments, in block 630, the personalization server 104 sends one or more applications 202 to the mobile computing device 102. Such applications 202 may be specified in the personalization data 210.

The personalization server 104 may retrieve the applications 202 from the application database 310. In some embodiments, the personalization server 104 may retrieve or forward the applications 202 from the application store 108.

In some embodiments, in block 632, the personalization server 104 sends a decryption key to the mobile computing device 102. Such decryption key corresponds to the encryption key described in relation to block 622; thus, for symmetric encryption the two keys may be identical. As described above, such decryption key may be used by the mobile computing device 102 to decrypt personalization data 210 stored on the physical security device 130. The personalization server 104 may hash, encrypt, or otherwise securely package the encryption key using the user credentials 212. In some embodiments, the personalization data 210 sent to the mobile computing device 102 may include only the decryption key. Note that in some embodiments, decryption may be possible without sending the decryption key to the mobile computing device 102; as described above, the mobile computing device 102 may store the key for later decryption, allowing use of encrypted personalization data 210 from the security device 130 without communication from the personalization server 104. Following block 628, the method 600 loops back to block 606 to await further requests.

Although the above-described illustrative embodiments include mobile computing devices 102, it should be understood that a mobile computing device 102 may be embodied as a stationary or substantially stationary computing device such as a desktop computer or a server.

EXAMPLES

Illustrative examples of the technologies disclosed herein are provided below. An embodiment of the technologies may include any one or more, and any combination of, the examples described below.

Example 1 includes a mobile computing device to personalize settings comprising a user credential management module to determine user credentials associated with a personalization server; a communication module to: send the user credentials from the mobile computing device to the personalization server; and receive personalization data from the personalization server in response to authentication of the user credentials by the personalization server, the personalization data originated from a different mobile computing device; and a personalization management module to install the personalization data on the mobile computing device to establish a configuration of the mobile computing device corresponding to a previous configuration of the different mobile computing device.

Example 2 includes the subject matter of Example 1, and wherein the different mobile computing device has an operating system different from an operating system of the mobile computing device.

Example 3 includes the subject matter of any of Examples 1 and 2, and wherein to determine the user credentials comprises to prompt a user of the mobile computing device for the user credentials.

Example 4 includes the subject matter of any of Examples 1-3, and wherein to determine the user credentials comprises to retrieve the user credentials from a physical security device separate from the mobile computing device.

Example 5 includes the subject matter of any of Examples 1-4, and further including a near-field communication circuit, wherein the physical security device comprises a smart card communicatively coupled to the mobile computing device via the near-field communication circuit.

Example 6 includes the subject matter of any of Examples 1-5, and further including a near-field communication circuit, wherein the physical security device comprises the different mobile computing device communicatively coupled to the mobile computing device via the near-field communication circuit.

Example 7 includes the subject matter of any of Examples 1-6, and further including a universal serial bus, wherein the physical security device comprises a memory card coupled to the mobile computing device via the universal serial bus.

Example 8 includes the subject matter of any of Examples 1-7, and wherein to receive the personalization data comprises to receive an application from the personalization server; and to install the personalization data comprises to install the application.

Example 9 includes the subject matter of any of Examples 1-8, and wherein to receive the personalization data comprises to receive an application from an application store other than the personalization server, based on the personalization data.

Example 10 includes the subject matter of any of Examples 1-9, and wherein to receive the personalization data comprises to receive a decryption key from the personalization server; and to decrypt, using the decryption key, encrypted personalization data stored on a physical security device separate from the mobile computing device.

Example 11 includes the subject matter of any of Examples 1-10, and further including a near-field communication circuit, wherein the physical security device comprises a smart card communicatively coupled to the mobile computing device via the near-field communication circuit.

Example 12 includes the subject matter of any of Examples 1-11, and further including a universal serial bus, wherein the physical security device comprises a memory card coupled to the mobile computing device via the universal serial bus.

Example 13 includes the subject matter of any of Examples 1-12, and wherein to install the personalization data comprises to install the personalization data for a temporary time period; and the personalization management module is further to determine whether the temporary time period has expired; and clear the personalization data in response to a determination that the temporary time period has expired to revert the configuration of the mobile computing device to an earlier configuration of the mobile computing device.

Example 14 includes the subject matter of any of Examples 1-13, and wherein to clear the personalization data comprises to securely delete the personalization data.

Example 15 includes the subject matter of any of Examples 1-14, and wherein the personalization management module is further to monitor user activity and determine updated personalization data based on the user activity; and the communication module is further to send the updated personalization data to the personalization server.

Example 16 includes the subject matter of any of Examples 1-15, and wherein the communication module is further to receive, from the personalization server, an encryption key; and the personalization management module is further to encrypt the updated personalization data using the encryption key; and store the encrypted updated personalization data on a physical security device separate from the mobile computing device.

Example 17 includes the subject matter of any of Examples 1-16, and further including a near-field communication circuit, wherein the physical security device comprises a smart card communicatively coupled to the mobile computing device via the near-field communication circuit.

Example 18 includes the subject matter of any of Examples 1-17, and further including a universal serial bus, wherein the physical security device comprises a memory card coupled to the mobile computing device via the universal serial bus.

Example 19 includes the subject matter of any of Examples 1-18, and wherein to install the personalization data comprises to install the personalization data for a temporary time period; and the personalization management module is further to determine whether the temporary time period has expired; and clear the personalization data and the updated personalization data in response to a determination that the temporary time period has expired to revert the configuration of the mobile computing device to an earlier configuration of the mobile computing device.

Example 20 includes the subject matter of any of Examples 1-19, and wherein to clear the personalization data and the updated personalization data comprises to securely delete the personalization data and the updated personalization data.

Example 21 includes a personalization server to support mobile computing device personalization, the personalization server comprising a communication module to receive a first request to back up personalization data from a first mobile computing device, the first request comprises user credentials and the personalization data; receive a second request for personalization data from a second mobile computing device, the second request comprises the user credentials; and a personalization management module to store, on the personalization server, the personalization data in association with the user credentials in response to receipt of the first request; and retrieve the personalization data based on the user credentials in response to receipt of the second request; wherein the communication module is further to send the personalization data to the second mobile computing device in response to receipt of the second request.

Example 22 includes the subject matter of Example 21, and wherein to store the personalization data comprises to store the personalization data in an operating-system-independent data format.

Example 23 includes the subject matter of any of Examples 21 and 22, and wherein the second mobile computing device has an operating system different from an operating system of the first mobile computing device.

Example 24 includes the subject matter of any of Examples 21-23, and further including a user credential management module to authenticate the user credentials in response to receipt of the first request and in response to receipt of the second request.

Example 25 includes the subject matter of any of Examples 21-24, and wherein the personalization management module is further to securely package an encryption key using the user credentials; and the communication module is further to send the packaged encryption key to the first mobile computing device in response to receipt of the first request, the encryption key usable to encrypt the personalization data on the first mobile computing device.

Example 26 includes the subject matter of any of Examples 21-25, and wherein the personalization management module is further to securely package a decryption key using the user credentials; and the communication module is further to send the decryption key from the personalization server to the second mobile computing device in response to receiving the second request, the decryption key usable to decrypt the personalization data on the second mobile computing device.

Example 27 includes the subject matter of any of Examples 21-26, and wherein to send the personalization data comprises to send an application to the second mobile computing device in response to receipt of the second request.

Example 28 includes a method for personalization of a mobile computing device, the method comprising determining, on the mobile computing device, user credentials associated with a personalization server; sending the user credentials from the mobile computing device to the personalization server; receiving, on the mobile computing device, personalization data from the personalization server in response to the user credentials being authenticated by the personalization server, the personalization data including personalization data originating from a different mobile computing device; and installing the personalization data on the mobile computing device to establish a configuration of the mobile computing device corresponding to a previous configuration of the different mobile computing device.

Example 29 includes the subject matter of Example 28, and wherein receiving the personalization data comprises receiving personalization data originating from the different mobile computing device having an operating system different from the operating system of the mobile computing device.

Example 30 includes the subject matter of any of Examples 28 and 29, and wherein determining the user credentials comprises prompting a user of the mobile computing device for the user credentials.

Example 31 includes the subject matter of any of Examples 28-30, and wherein determining the user credentials comprises retrieving the user credentials from a physical security device separate from the mobile computing device.

Example 32 includes the subject matter of any of Examples 28-31, and wherein retrieving the user credentials comprises receiving the user credentials from a smart card via a near-field communication capability of the mobile computing device.

Example 33 includes the subject matter of any of Examples 28-32, and wherein retrieving the user credentials comprises receiving the user credentials from the different mobile computing device via a near-field communication capability of the mobile computing device.

Example 34 includes the subject matter of any of Examples 28-33, and wherein retrieving the user credentials comprises receiving the user credentials from a memory card via a universal serial bus of the mobile computing device.

Example 35 includes the subject matter of any of Examples 28-34, and wherein receiving the personalization data comprises receiving an application from the personalization server; and installing the personalization data comprises installing the application.

Example 36 includes the subject matter of any of Examples 28-35, and wherein receiving the personalization data comprises receiving an application from an application store other than the personalization server, based on the personalization data.

Example 37 includes the subject matter of any of Examples 28-36, and wherein receiving the personalization data comprises receiving a decryption key from the personalization server; and decrypting, using the decryption key, encrypted personalization data stored on a physical security device separate from the mobile computing device.

Example 38 includes the subject matter of any of Examples 28-37, and wherein decrypting the encrypted personalization data further comprises receiving the encrypted personalization data from a smart card via a near-field communication capability of the mobile computing device.

Example 39 includes the subject matter of any of Examples 28-38, and wherein decrypting the encrypted personalization data further comprises retrieving the encrypted personalization data stored from a memory card via a universal serial bus of the mobile computing device.

Example 40 includes the subject matter of any of Examples 28-39, and wherein installing the personalization data comprises installing the personalization data for a temporary time period, the method further comprising determining, on the mobile computing device, whether the temporary time period has expired; and clearing, on the mobile computing device, the personalization data in response to determining the temporary time period has expired to revert the configuration of the mobile computing device to an earlier configuration of the mobile computing device.

Example 41 includes the subject matter of any of Examples 28-40, and wherein clearing the personalization data comprises securely deleting the personalization data.

Example 42 includes the subject matter of any of Examples 28-41, and further including monitoring, on the mobile computing device, user activity; determining, on the mobile computing device, updated personalization data based on the user activity; and sending the updated personalization data to the personalization server.

Example 43 includes the subject matter of any of Examples 28-42, and further including receiving, from the personalization server, an encryption key; encrypting, on the mobile computing device, the updated personalization data using the encryption key; and storing the encrypted updated personalization data on a physical security device separate from the mobile computing device.

Example 44 includes the subject matter of any of Examples 28-43, and wherein storing the encrypted updated personalization data comprises storing the encrypted updated personalization data on a smart card via a near-field communication capability of the mobile computing device.

Example 45 includes the subject matter of any of Examples 28-44, and wherein storing the encrypted updated personalization data comprises storing the encrypted updated personalization data on a memory card via a universal serial bus of the mobile computing device.

Example 46 includes the subject matter of any of Examples 28-45, and wherein installing the personalization data comprises installing the personalization data for a temporary time period, the method further comprising determining, on the mobile computing device, whether the temporary time period has expired; and clearing, on the mobile computing device, the personalization data and the updated personalization data in response to determining the temporary time period has expired to revert the configuration of the mobile computing device to an earlier configuration of the mobile computing device.

Example 47 includes the subject matter of any of Examples 28-46, and wherein clearing the personalization data and the updated personalization data comprises securely deleting the personalization data and the updated personalization data.

Example 48 includes a method for mobile computing device personalization comprising receiving, on a personalization server, a first request to back up personalization data from a first mobile computing device, the first request including user credentials and the personalization data; storing, on the personalization server, the personalization data including an association between the personalization data and the user credentials in response to receiving the first request; receiving, on the personalization server, a second request for personalization data from a second mobile computing device, the second request including the user credentials; retrieving, on the personalization server, the personalization data based on the user credentials in response to receiving the second request; and sending the personalization data from the personalization server to the second mobile computing device in response to receiving the second request.

Example 49 includes the subject matter of Example 48, and wherein storing the personalization data comprises storing the personalization data in an operating-system-independent data format.

Example 50 includes the subject matter of any of Examples 48 and 49, and wherein sending the personalization data comprises sending the personalization data to the second computing device having an operating system different from the operating system of the first computing device.

Example 51 includes the subject matter of any of Examples 48-50, and further including authenticating the user credentials in response to receiving the first request and in response to receiving the second request.

Example 52 includes the subject matter of any of Examples 48-51, and further including securely packaging, on the personalization server, an encryption key using the user credentials; and sending the packaged encryption key from the personalization server to the first mobile computing device in response to receiving the first request, the encryption key usable to encrypt the personalization data on the first mobile computing device.

Example 53 includes the subject matter of any of Examples 48-52, and further including securely packaging, on the personalization server, a decryption key using the user credentials; and sending the decryption key from the personalization server to the second mobile computing device in response to receiving the second request, the decryption key usable to decrypt the personalization data on the second mobile computing device.

Example 54 includes the subject matter of any of Examples 48-53, and wherein sending the personalization data comprises sending an application to the second mobile computing device in response to receiving the second request.

Example 55 includes a computing device comprising a processor; and a memory having stored therein a plurality of instructions that when executed by the processor cause the computing device to perform the method of any of Examples 28-54.

Example 56 includes one or more machine-readable storage media comprising a plurality of instructions stored thereon that in response to being executed result in a computing device performing the method of any of Examples 28-54.

Example 57 includes a mobile computing device to personalize settings comprising means for determining user credentials associated with a personalization server; means for sending the user credentials from the mobile computing device to the personalization server; means for receiving personalization data from the personalization server in response to the user credentials being authenticated by the personalization server, the personalization data including personalization data originating from a different mobile computing device; and means for installing the personalization data on the mobile computing device to establish a configuration of the mobile computing device corresponding to a previous configuration of the different mobile computing device.

Example 58 includes the subject matter of Example 57, and wherein the means for receiving the personalization data comprises means for receiving personalization data originating from the different mobile computing device having an operating system different from the operating system of the mobile computing device.

Example 59 includes the subject matter of any of Examples 57 and 58, and wherein the means for determining the user credentials comprises means for prompting a user of the mobile computing device for the user credentials.

Example 60 includes the subject matter of any of Examples 57-59, and wherein the means for determining the user credentials comprises means for retrieving the user credentials from a physical security device separate from the mobile computing device.

Example 61 includes the subject matter of any of Examples 57-60, and wherein the means for retrieving the user credentials comprises means for receiving the user credentials from a smart card via a near-field communication capability of the mobile computing device.

Example 62 includes the subject matter of any of Examples 57-61, and wherein the means for retrieving the user credentials comprises means for receiving the user credentials from the different mobile computing device via a near-field communication capability of the mobile computing device.

Example 63 includes the subject matter of any of Examples 57-62, and wherein the means for retrieving the user credentials comprises means for receiving the user credentials from a memory card via a universal serial bus of the mobile computing device.

Example 64 includes the subject matter of any of Examples 57-63, and wherein the means for receiving the personalization data comprises means for receiving an application from the personalization server; and the means for installing the personalization data comprises means for installing the application.

Example 65 includes the subject matter of any of Examples 57-64, and wherein the means for receiving the personalization data comprises means for receiving an application from an application store other than the personalization server, based on the personalization data.

Example 66 includes the subject matter of any of Examples 57-65, and wherein the means for receiving the personalization data comprises means for receiving a decryption key from the personalization server; and means for decrypting, using the decryption key, encrypted personalization data stored on a physical security device separate from the mobile computing device.

Example 67 includes the subject matter of any of Examples 57-66, and wherein the means for decrypting the encrypted personalization data further comprises means for receiving the encrypted personalization data from a smart card via a near-field communication capability of the mobile computing device.

Example 68 includes the subject matter of any of Examples 57-67, and wherein the means for decrypting the encrypted personalization data further comprises means for retrieving the encrypted personalization data stored from a memory card via a universal serial bus of the mobile computing device.

Example 69 includes the subject matter of any of Examples 57-68, and wherein the means for installing the personalization data comprises installing the personalization data for a temporary time period, the mobile computing device further comprising means for determining whether the temporary time period has expired; and means for clearing the personalization data in response to determining the temporary time period has expired to revert the configuration of the mobile computing device to an earlier configuration of the mobile computing device.

Example 70 includes the subject matter of any of Examples 57-69, and wherein the means for clearing the personalization data comprises means for securely deleting the personalization data.

Example 71 includes the subject matter of any of Examples 57-70, and further including means for monitoring user activity; means for determining updated personalization data based on the user activity; and means for sending the updated personalization data to the personalization server.

Example 72 includes the subject matter of any of Examples 57-71, and further including g means for receiving, from the personalization server, an encryption key; means for encrypting the updated personalization data using the encryption key; and means for storing the encrypted updated personalization data on a physical security device separate from the mobile computing device.

Example 73 includes the subject matter of any of Examples 57-72, and wherein the means for storing the encrypted updated personalization data comprises means for storing the encrypted updated personalization data on a smart card via a near-field communication capability of the mobile computing device.

Example 74 includes the subject matter of any of Examples 57-73, and wherein the means for storing the encrypted updated personalization data comprises means for storing the encrypted updated personalization data on a memory card via a universal serial bus of the mobile computing device.

Example 75 includes the subject matter of any of Examples 57-74, and wherein the means for installing the personalization data comprises means for installing the personalization data for a temporary time period, the mobile computing device further comprising means for determining whether the temporary time period has expired; and means for clearing the personalization data and the updated personalization data in response to determining the temporary time period has expired to revert the configuration of the mobile computing device to an earlier configuration of the mobile computing device.

Example 76 includes the subject matter of any of Examples 57-75, and wherein the means for clearing the personalization data and the updated personalization data comprises means for securely deleting the personalization data and the updated personalization data.

Example 77 includes a personalization server to support mobile computing device personalization, the personalization server comprising means for receiving a first request to back up personalization data from a first mobile computing device, the first request including user credentials and the personalization data; means for storing the personalization data including an association between the personalization data and the user credentials in response to receiving the first request; means for receiving a second request for personalization data from a second mobile computing device, the second request including the user credentials; means for retrieving the personalization data based on the user credentials in response to receiving the second request; and means for sending the personalization data from the personalization server to the second mobile computing device in response to receiving the second request.

Example 78 includes the subject matter of Example 77, and wherein the means for storing the personalization data comprises means for storing the personalization data in an operating-system-independent data format.

Example 79 includes the subject matter of any of Examples 77 and 78, and wherein the means for sending the personalization data comprises means for sending the personalization data to the second computing device having an operating system different from the operating system of the first computing device.

Example 80 includes the subject matter of any of Examples 77-79, and further including means for authenticating the user credentials in response to receiving the first request and in response to receiving the second request.

Example 81 includes the subject matter of any of Examples 77-80, and further including means for securely packaging an encryption key using the user credentials; and means for sending the packaged encryption key from the personalization server to the first mobile computing device in response to receiving the first request, the encryption key usable to encrypt the personalization data on the first mobile computing device.

Example 82 includes the subject matter of any of Examples 77-81, and further including means for securely packaging a decryption key using the user credentials; and means for sending the decryption key from the personalization server to the second mobile computing device in response to receiving the second request, the decryption key usable to decrypt the personalization data on the second mobile computing device.

Example 83 includes the subject matter of any of Examples 77-82, and wherein the means for sending the personalization data comprises means for sending an application to the second mobile computing device in response to receiving the second request.

The invention claimed is:

1. A mobile computing device to perform one-touch personalization of settings comprising:
user credential management circuitry to determine user credentials associated with personalization data stored by a personalization server, wherein the user credentials are registered with the personalization server by a different mobile computing device and associated with the personalization data by the different mobile computing device;
communication circuitry to:
send the user credentials from the mobile computing device to the personalization server;
receive, at a first time, a decryption key encrypted by the personalization server and the personalization data from the personalization server in response to authentication of the user credentials by the personalization server, the personalization data originated from and was encrypted by the different mobile computing device, wherein the personalization server used the user credentials to encrypt the decryption key;
transmit, at a second time that is subsequent to the first time, only a subset of the personalization data to the personalization server, wherein the subset of the personalization data changed between the first time and the second time, while a remainder of the personalization data did not change between the first time and the second time; and
personalization management circuitry to:
decrypt, with the user credentials, the encrypted decryption key;
decrypt, with the decryption key, the personalization data received from the personalization server;
install, for a temporary time period, the personalization data on the mobile computing device to establish a configuration of the mobile computing device corresponding to a previous configuration of the different mobile computing device;
monitor user activity in one or more applications executed by the mobile computing device to identify, for transmission to the personalization server, the subset of the personalization data that changed between the first time and the second time, wherein the personalization data defines a configuration of the one or more applications and is converted to an operating system independent format for storage by the personalization server;
determine whether the temporary time period has expired; and
clear the personalization data in response to a determination that the temporary time period has expired to revert the configuration of the mobile computing device to an earlier configuration of the mobile computing device.

2. The mobile computing device of claim 1, wherein the personalization management circuitry is further to convert the personalization data between the operating system independent format and a native format associated with a vendor of the mobile computing device, wherein the operating system independent format is different from the native format.

3. The mobile computing device of claim 1, wherein to determine the user credentials comprises to retrieve the user credentials from a physical security device separate from the mobile computing device.

4. The mobile computing device of claim 3, further comprising one of a near-field communication circuit or a universal serial bus, wherein the physical security device comprises one of a smart card communicatively coupled to the mobile computing device via the near-field communication circuit, the different mobile computing device communicatively coupled to the mobile computing device via the near-field communication circuit, or a memory card coupled to the mobile computing device via the universal serial bus.

5. The mobile computing device of claim 1, wherein:
the personalization management circuitry is further to store the personalization data in a virtualization partition of the mobile computing device; and
to clear the personalization data further comprises to preserve encrypted personalization data stored in a physical security device coupled to the mobile computing device.

6. A method for one-touch personalization of a mobile computing device, the method comprising:
determining, on the mobile computing device, user credentials associated with personalization data stored by a personalization server, wherein the user credentials are registered with the personalization server by a different mobile computing device and associated with the personalization data by the different mobile computing device;

sending the user credentials from the mobile computing device to the personalization server;

receiving, on the mobile computing device at a first time, a decryption key encrypted by the personalization server and the personalization data from the personalization server in response to the user credentials being authenticated by the personalization server, the personalization data including personalization data originating from the different mobile computing device, wherein the personalization server used the user credentials to encrypt the decryption key;

decrypting, by the mobile computing device and with the user credentials, the encrypted decryption key;

decrypting, by the mobile computing device, with the decryption key, the personalization data received from the personalization server;

converting, by the mobile computing device, the personalization data from an operating system independent format to a native format associated with a vendor of the mobile computing device, wherein the operating system independent format is different from the native format;

installing, for a temporary time period, the personalization data on the mobile computing device to establish a configuration of the mobile computing device corresponding to a previous configuration of the different mobile computing device;

monitoring user activity in one or more applications executed by the mobile computing device to identify, for transmission to the personalization server, a subset of the personalization data that changed between the first time and a second time that is subsequent to the first time, wherein the personalization data defines a configuration of the one or more applications;

transmitting, at the second time, the subset of the personalization data to the personalization server without transmitting a remainder of the personalization data that did not change between the first time and the second time;

determining, by the mobile computing device, whether the temporary time period has expired; and clearing, by the mobile computing device, the personalization data in response to a determination that the temporary time period has expired to revert the configuration of the mobile computing device to an earlier configuration of the mobile computing device.

7. The method of claim 6, wherein receiving the personalization data comprises receiving personalization data originating from the different mobile computing device having an operating system and vendor different from the operating system and vendor of the mobile computing device.

8. The method of claim 6, wherein determining the user credentials comprises retrieving the user credentials from a physical security device separate from the mobile computing device.

9. The method of claim 6, further comprising:
storing, by the mobile computing device, the personalization data in a virtualization partition.

10. One or more non-transitory, machine readable storage media to enable one-touch personalization, the one or more non-transitory, machine readable storage media comprising a plurality of instructions that in response to being executed cause a mobile computing device to:

determine user credentials associated with personalization data stored by a personalization server, wherein the user credentials are registered with the personalization server by a different mobile computing device and associated with the personalization data by the different mobile computing device;

send the user credentials from the mobile computing device to the personalization server;

receive a decryption key encrypted by the personalization server and the personalization data from the personalization server at a first time, in response to authentication of the user credentials by the personalization server, the personalization data including personalization data originating from the different mobile computing device having a different operating system and vendor than the mobile computing device, wherein the personalization server used the user credentials to encrypt the decryption key;

decrypt, with the user credentials, the encrypted decryption key;

decrypt, with the decryption key, the personalization data received from the personalization server;

convert the personalization data from an operating system independent format to a native format associated with the mobile computing device, wherein the operating system independent format is different from the native format;

install, for a temporary time period, the personalization data on the mobile computing device to establish a configuration of the mobile computing device corresponding to a previous configuration of the different mobile computing device;

monitor user activity in one or more applications executed by the mobile computing device to identify, for transmission to the personalization server, a subset of the personalization data that changed between the first time and a second time that is subsequent to the first time, wherein the personalization data defines a configuration of the one or more applications;

transmit, at the second time, the subset of the personalization data to the personalization server without a remainder of the personalization data that did not change between the first time and the second time; and determine whether the temporary time period has expired; and clear the personalization data in response to a determination that the temporary time period has expired to revert the configuration of the mobile computing device to an earlier configuration of the mobile computing device.

11. The non-transitory, machine readable media of claim 10, wherein to determine the user credentials comprises to retrieve the user credentials from a physical security device separate from the mobile computing device.

12. The non-transitory, machine readable media of claim 11, wherein to retrieve the user credentials comprises one of to:

receive the user credentials from a smart card via a near-field communication capability of the mobile computing device;

receive the user credentials from the different mobile computing device via a near-field communication capability of the mobile computing device; or receive the user credentials from a memory card via a universal serial bus of the mobile computing device.

13. The non-transitory, machine readable media of claim 10, further comprising a plurality of instructions that in response to being executed cause the mobile computing device to:
    store the personalization data in a virtualization partition of the mobile computing device.

\* \* \* \* \*